United States Patent [19]

Hefner, Jr. et al.

[11] Patent Number: 4,883,844

[45] Date of Patent: Nov. 28, 1989

[54] SUBSTITUTED STYRYLAZA EPOXY RESINS

[75] Inventors: Robert E. Hefner, Jr., Lake Jackson, Tex.; John W. Robinson, Niagara Falls, N.Y.; Jimmy D. Earls, Lake Jackson, Tex.

[73] Assignee: The Dow Chemical Company, Midland, Mich.

[21] Appl. No.: 280,414

[22] Filed: Dec. 6, 1988

Related U.S. Application Data

[63] Continuation-in-part of Ser. No. 101,048, Sep. 5, 1987, abandoned.

[51] Int. Cl.$^4$ .................... C08G 16/04; C08G 59/02
[52] U.S. Cl. .................................. 525/472; 525/523; 525/526; 525/529; 528/96; 528/101; 528/107; 544/357; 546/256

[58] Field of Search ............... 528/96, 99, 101, 107; 525/509, 510, 504, 472, 526, 523, 529; 544/357; 546/256

[56] References Cited

U.S. PATENT DOCUMENTS

| | | | |
|---|---|---|---|
| 3,716,549 | 2/1973 | Darsow et al. | 528/96 X |
| 4,546,131 | 10/1985 | Hefner et al. | 528/96 X |
| 4,578,439 | 3/1986 | Hefner et al. | 525/509 |
| 4,600,767 | 7/1986 | Diephouse et al. | 528/252 |

*Primary Examiner*—Earl Nielsen
*Attorney, Agent, or Firm*—B. G. Colley

[57] ABSTRACT

Epoxy resins of substituted hydroxystyrylaza compounds are disclosed. These thermosettable epoxy resins are cured to give a combination of high mechanical strength and glass transition temperature.

4 Claims, No Drawings

SUBSTITUTED STYRYLAZA EPOXY RESINS

This application is a continuation-in-part of the copending application Ser. No. 101,048, filed September 5, 1987 now abandoned.

BACKGROUND OF THE INVENTION

The present invention provides novel substituted epoxidized hydroxystyrylaza compounds, as well as cured compositions prepared from said epoxy resins.

Preparation of unsubstituted epoxidized hydroxystyryl pyridines is taught by Yan, Pearce and Bulkin in Organic Coatings and Applied Polymer Science Proceedings, volume 46, pages 482–488 published by American Chemical Society (1981). These epoxy resins differ from those of the present invention as being higher melting, thus more difficult to process. A further difference is the poor thermal stability of the prior art unsubstituted styryl pyridine epoxy resins relative to the substituted styryl pyridine epoxy resins of the present invention. As a specific example, the epoxy resin of 2,6-di(4-hydroxystyryl)pyridine prepared by Yan and coworkers possessed a 175.3° C. melting point and exhibited multiple cure exotherms at 289.5°, 305°, 334° and 355° C. (see page 486, Table 2 of the cited article). By way of contrast, the corresponding substituted styryl pyridine epoxy resin of the present invention, the epoxy resin of 2,6-di(3,5-dimethyl-4-hydroxystyryl)pyridine, unexpectedly provides a lower melting point of 158° C. and a single cure exotherm at 315° C. The poor thermal stability of the unsubstituted styryl pyridine epoxy resins of the prior art is exemplified by the epoxy resin of 2,4,6-tri(4-hydroxystyryl)pyridine which gelled and then exothermically decomposed to a black char during workup at 80° C. (see Comparative Experiment C herein).

All of the aforementioned substantial and unexpected differences between the unsubstituted styryl pyridine epoxy resins of the prior art and the substituted styryl pyridine epoxy resins of the present invention are proposed to occcur as a result of reactive sites on the unsubstituted hydroxybenzaldehyde precursor to the unsubstituted hydroxystyryl pyridine used in the prior art epoxidation reaction. Specifically, these reactive sites lead to branched structure which elevates melting point, induces multiplicity in the thermal curing reaction and reduces processability. This branching can also sterically hinder phenolic hydroxyl groups which would otherwise be epoxidized. During workup of the resulting partially epoxidized product or subjection to some other source of thermal exposure, molecular motion increases thus making the phenolic hydroxyl groups available for reaction with epoxide groups also present in the molecules. Uncontrolled exothermic decomposition can then result. A specific example of the branching structure is shown for the hydroxystyryl pyridine precursor to an unsubstituted epoxy resin prepared using 2,4,6-trimethylpyridine and 4-hydroxybenzaldehyde:

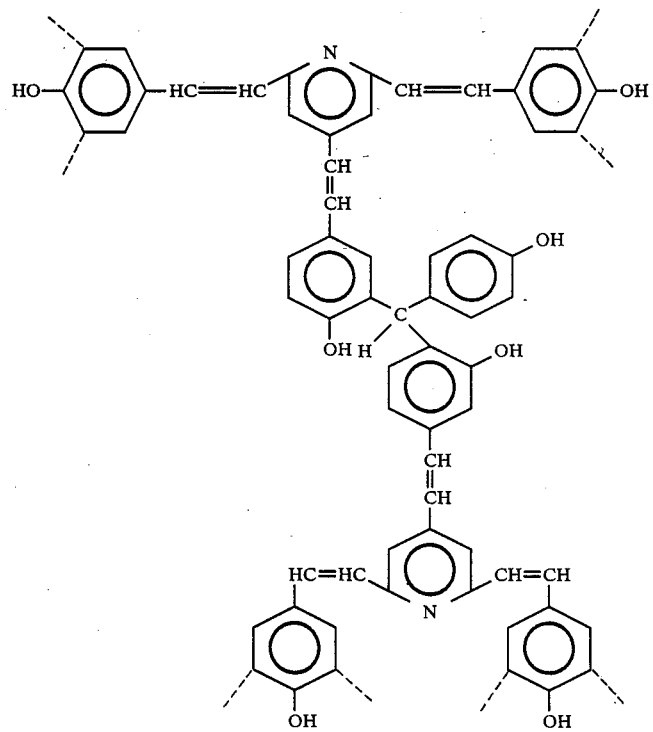

A specific example of the lack of branching inherent to the compositions of the present invention is shown for the substituted hydroxystyryl pyridine precursor to a substituted epoxy resin prepared using 3,5-dimethyl-4-hydroxybenzaldehyde and 2,6-dimethylpyridine:

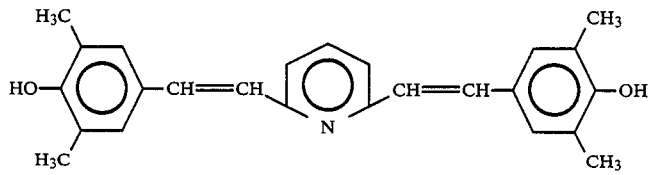

The non-branched structure of this product results from the blocking of both ortho positions to the phenolic hydroxyl groups with methyl groups. This prevents the competing aldehyde-aromatic ring condensation reaction which produces hydroxy functional dialdehydes responsible for the branching in the unsubstituted products:

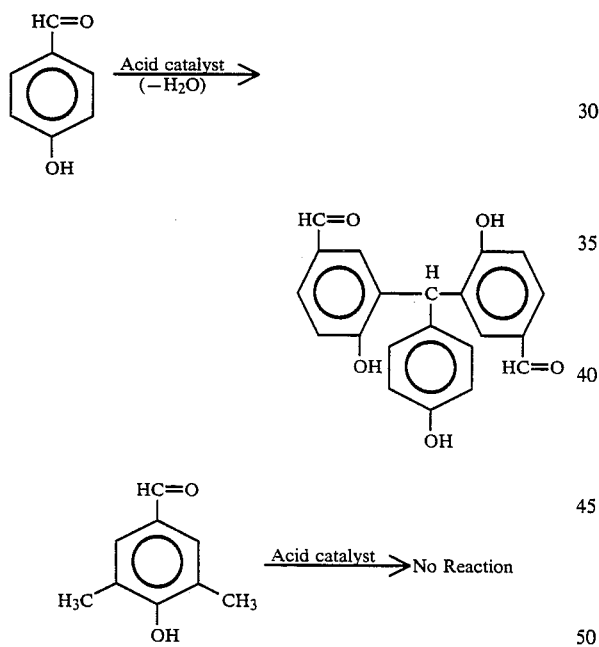

The substituted epoxy resin compositions of the present invention contain styrylaza groups and are obtained by reaction of one or more substituted hydroxystyrylaza compounds as described by U.S. Pat. No. 4,600,767 which is incorporated herein by reference. Epoxidation of the substituted hydroxystyrylaza compound is completed in a conventional manner by reaction with an epihalohydrin with subsequent dehydrohalogenation with a basic-acting material and finally recovering the resultant styrylaza functional glycidyl ether product. The invention consists of the substituted epoxy resins containing styrylaza groups, whether or not cured.

The cured substituted styrylaza epoxy resins provide a combination of high mechanical strength and glass transition temperature. The enhancement of these properties is proposed to result from the self-reinforcing characteristic imparted by the anisodiametric styrylaza nucleus.

SUMMARY OF THE INVENTION

The present invention pertains to substituted epoxy resin compositions containing styrylaza groups. Said compositions are prepared by reacting (a) one or more substituted hydroxystyrylaza compounds with (b) one or more epihalohydrins in the presence of (c) one or more basic-acting substances.

Another aspect of the present invention pertains to the product resulting from curing the aforementioned substituted epoxy resins containing styrylaza groups.

Another aspect of the present invention pertains to a polymerizable mixture of (A) at least one of the aforementioned substituted epoxy resin compositions containing styrylaza groups and (B) at least one material selected from (1) styryl pyridines and/or prepolymers or polymers thereof;

(2) vinyl styryl pyridines and/or prepolymers or polymers thereof;

(3) alkenylphenyl cyanates;

(4) dicyanates and/or polycyanates;

(5) bismaleimides and/or polymaleimides;

(6) epoxy resins;

(7) alkenylphenol capped styryl pyridines and/or prepolymers or polymers thereof;

(8) allyl styryl pyridines and/or prepolymers or polymers thereof;

(9) styryl pyridine cyanates and/or prepolymers or polymers thereof;

(10) furan capped styryl pyridines and/or prepolymers or polymers thereof;

(11) alkenylphenyl glycidyl ether capped hydroxystyryl pyridines and/or prepolymers or polymers thereof;

(12) polymerizable ethylenically unsaturated monomers;

(13) mixtures thereof in any proportion and combination.

Another aspect of the present invention pertains to polymers and/or cured products of the aforementioned polymerizable and/or curable mixtures.

DETAILED DESCRIPTION OF THE INVENTION

Suitable substituted hydroxystyrylaza compounds which can be employed to prepare the substituted epoxy resins of the present invention include, for example, those represented by the formulas:

FORMULA I

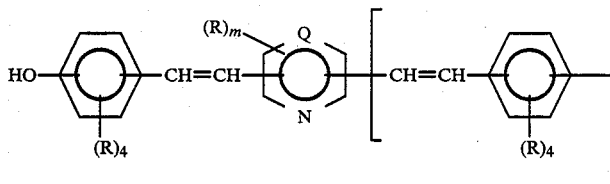
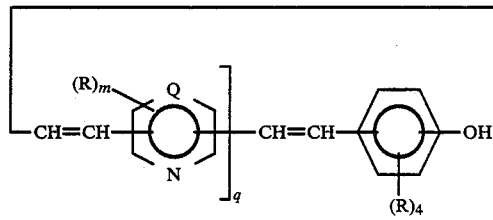

FORMULA II

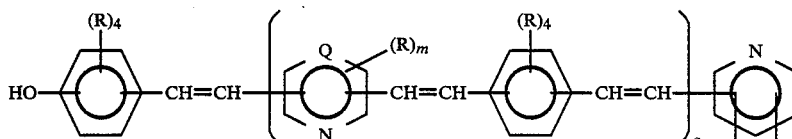

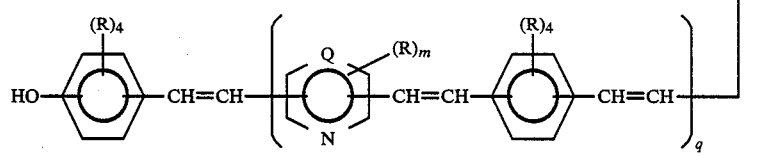

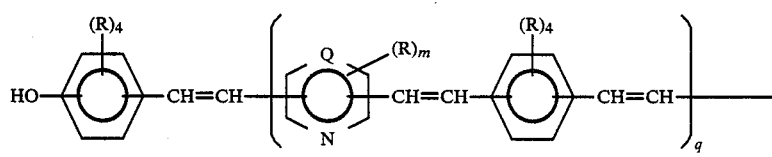

wherein each Q is independently C-R or N and when Q is C-R, m is 3, when Q is N, m is 2; each R is independently hydrogen, a halogen, preferably chlorine or bromine, a hydrocarbyl or hydrocarbyloxy group having from 1 to about 20, preferably from 1 to about 4 carbon atoms, nitro, nitroso, nitrile,

allyl or a methallyl group; E is a hydrocarbyl group having from 1 to about 20 carbon atoms with the proviso that the R groups ortho or para to the phenolic hydroxyl group may not be hydrogen and each q has a value from 0 to about 50.

It is to be understood that in addition to the structures represented by Formulas I and II that minor amounts of other structures may be present. Typical of the minor structures present is that resulting from the addition of a methylgroup of a methylated azine compound to the styryl double bond. This type of addition product is described by Clavreul and Bloch in Makromol. Chem., 188, pp. 47-65 (1987).

The substituted hydroxystyrylaza compounds useful to prepare the substituted styrylaza epoxy resin compositions of the present invention are prepared using the method set forth in previously cited U.S. Pat. No. 4,600,767. In the method, the substituted hydroxystyrylaza compounds are prepared by reacting (A) one or more monohydroxy aromatic aldehydes wherein the ortho and para positions from the hydroxy group having no aldehyde group are substituted by groups inert to condensation with alkyl azine compounds, and (B) one or more alkyl azine compounds having the formula

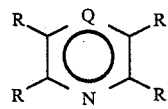

wherein Q and R are as hereinbefore defined and with the proviso that the total number of methyl groups (R=CH$_3$) substituted in the ring is in the range from 2 to 4.

When chain extended substituted hydroxystyrylaza compounds are desired as precursors to the substituted styrylaza epoxy resin compositions of the present invention, such as, for example, those represented by Formulas I and II wherein q has a value of 1 to about 50, one or more aromatic dialdehydes may be included in the aforementioned reaction of (A) one or more substituted monohydroxy aromatic aldehydes and (B) one or more alkyl azine compounds. Suitable such aromatic dialdehydes are represented by the formula

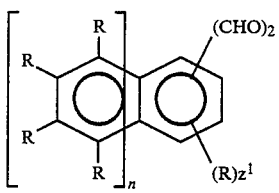

wherein R is a hereinbefore defined, n has a value of zero or 1 and when n is zero, $z^1$ is 4, when n is 1, $z^1$ is 2. Preferred as the aromatic dialdehyde is terephthaldehyde; 2,3,5,6-tetramethylterephthaldehyde; 2,3,5,6-tetrachloroterephthaldehyde; 2,5-dimethylterephthaldehyde; 2,5-dicyanoterephthaldehyde; 2,3-diethylterephthaldehyde; naphthalene-1,4-dialdehyde; mixtures thereof and the like.

Particularly suitable substituted hydroxystyrylaza compounds include, for example, 2,6-(3,5-dimethyl-4-hydroxystyryl)pyridine; 2,4-(3,5-dimethyl-4-hydroxystyryl)pyridine; 2,6-(3,5-dimethyl-2-hydroxystyryl)pyridine; 2,6-(2,3,5,6-tetramethyl-4-hydroxystyryl)pyridine; 2,6-(3,5-dibromo-4-hydroxystyryl)pyridine; 2,6-(3,5-dimethoxy-4-hydroxystyryl)pyridine; 2,6-(3,5-dimethyl-2,6-dibromo-4-hydroxystyryl)pyridine; 2,6-(3,5-diethyl-4-hydroxylstyryl)pyridine; 2,6-(3,5-diallyl-4-hydroxylstyryl)pyridine; 2,6-(3-methyl-5-tert-butyl-4-hydroxystyryl)pyridine; 2,6-(3-methyl-5-nitro-4-hydroxystyryl)pyridine; 2,6-(3-methyl-5-cyano-4-hydroxystyryl)pyridine; 2,6-(3,5-dimethyl-4-hydroxystyryl)pyrazine; 2,5-(3,5-dimethyl-4-hydroxystyryl)pyrazine; 2,4,6-(3,5-dimethyl-4-hydroxystyryl)pyridine; 2,4,6-(3,5-dimethyl-2-hydroxystyryl)pyridine, mixtures thereof and the like.

Suitable epihalohydrins for reaction with the substituted hydroxystyrylaza compounds include, for example, epichlorohydrin, epibromohydrin, methyl epichlorohydrin, mixtures thereof, and the like. Epichlorohydrin is most preferred as the epihalohydrin.

Suitable basic-acting substances for use in the epoxidation reaction include, for example, the alkali metal hydroxides, such as sodium and potassium hydroxide; the quaternary ammonium salts, such benzyltrimethylammonium chloride and tetramethylammonium hydroxide; mixtures thereof and the like.

The epoxidation can be performed by the known methods described in *Handbook of Epoxy Resins* by Lee and Neville, McGraw-Hill (1967) which is incorporated herein by reference. Said epoxidation generally involves two distinct steps: coupling reaction of the epihalohydrin and substituted hydroxystyryl diphenol or polyphenol to provide a halohydrin intermediate and dehydrohalogenation reaction of the halohydrin intermediate to provide the glycidyl ether product.

The reaction to produce the substituted epoxy resin containing styrylaza groups is usually conducted at a temperature of from about 30° C. to about 80°, preferably from about 45° C. to about 70° C. for from about 15 minutes to about 300 minutes, preferably from about 30 to about 120 minutes. Although reaction stoichiometry can vary substantially, a mole ratio of phenolic hydroxyl groups to epihalohydrin of from about 1:2 to about 1:20, preferably from about 1:5 to about 1:8, may be used. The reaction to produce the substituted epoxy resin containing styrylaza groups is optionally conducted in one or more organic solvents inert to the other reactants. The term inert as applied to the organic solvent means that little, if any, reaction between the hydroxystyrylaza compound, the epihalohydrin, the basic-acting substance, or the resultant epoxy resin product occurs under the reaction conditions employed. Typical of the inert solvents are the aliphatic alcohols, such as isopropanol and propylene glycol monomethyl ether; the chlorinated hydrocarbons, such as perchloroethylene; the aromatic hydrocarbons, such as toluene and xylene, and the aliphatic ketones, such as methylethylketone and methylisobutylketone.

Advancement reaction of the substituted epoxy resins containing styrylaza groups with one or more polyphenols or polycarboxylic acids is optionally, although preferably, completed in the presence of one or more advancement catalysts. Suitable advancement catalysts which can be employed herein include most any catalyst which will catalyze the reaction between a vicinal epoxide group and a phenolic hydroxyl group or carboxylic acid group. Such catalysts include, for example, those disclosed in U.S. Pat. Nos. 3,306,872; 3,341,580; 3,379,684; 3,477,990; 3,547,881; 3,637,590; 3,843,605; 3,948,855; 3,956,237; 4,048,141; 4,093,650; 4,131,633; 4,132,706; 4,177,216; 4,366,295 which are incorporated herein by reference.

Particularly suitable catalysts are the quaternary phosphonium and ammonium compounds such as, for example, ethyltriphenylphosphonium chloride, ethyltriphenylphosphonium bromide, ethyltriphenylphosphonium iodide, ethyltriphenylphosphonium acetate, ethyltriphenylphosphonium acetate.acetic acid complex, ethyltriphenylphosphonium phosphate, tetrabutylphosphonium chloride, tetrabutylphosphonium bromide, tetrabutylphosphonium iodide, tetrabutylphosphonium acetate, tetrabutylphosphonium acetate.acetic acid complex, butyltriphenylphosphonium tetrabromobisphenate, butyltriphenylphosphonium bicarbonate, benzyltrimethylammonium chloride, tetramethylammonium hydroxide, mixtures thereof and the like.

The reaction to produce the advanced substituted epoxy resin containing styrylaza groups is generally conducted at a temperature of from about 75° C. to about 250° C., preferably from about 125° C. to about 220° C. for from about 15 minutes to about 480 minutes, preferably from about 30 minutes to about 120 minutes.

In a preferred embodiment of the present invention, the substituted epoxy resin containing styrylaza groups is advanced by reaction with one or more of the aforementioned substituted hydroxystyrylaza compounds.

Suitable curing agents and/or catalysts for curing the substituted epoxy resins containing styrylaza groups of the present invention are described in the aforementioned *Handbook of Epoxy Resins.*

Styryl pyridine prepolymers and/or polystyryl pyridines which can be employed to prepare the polymerizable mixtures of the present invention include those described by Ropars et al in U.S. Pat. Nos. 3,994,862 and 4,525,573; Melassine et al in U.S. Pat. No. 4,163,740 and Chevallier in U.S. Pat. No. 4,540,770 which are incorporated herein by reference.

Suitable vinyl styryl pyridines and/or vinyl polystyryl pyridines which can be employed herein include those described by Ratto et al in U.S. Pat. No. 4,362,860; by Peake in U.S. Pat. No. 4,471,107; and by Ming-ta et al in Technology Vectors, Vol. 29, pages 1034–1042 (1984) published by the Society for the Advancement of Material and Process Engineering which are incorporated herein by reference. A specific preparation of a vinyl polystyryl pyridine is taught by Hefner, Jr. in U.S. Pat. No. 4,578,439 which is additionally incorporated herein by reference.

Suitable alkenylphenyl cyanates which can be employed herein include, for example, those represented by the formula propenylphenyl cyanate is taught by Hefner, Jr. in U.S. Pat. No. 4,578,439 which is incorporated herein by reference.

Suitable aromatic dicyanates (polycyanates) which can be employed herein include, for example, those represented by the formulas

FORMULA IV

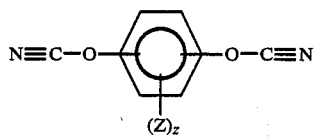

FORMULA V

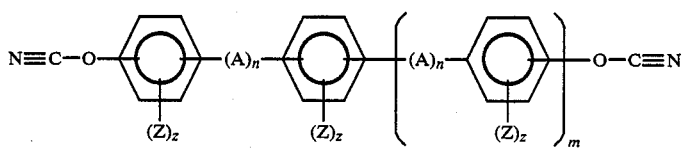

FORMULA VI

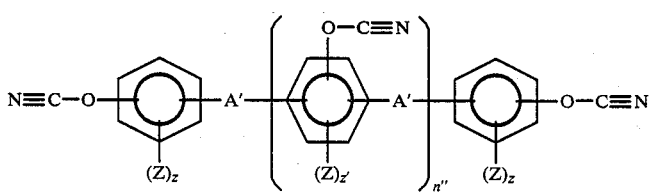

FORMULA VII

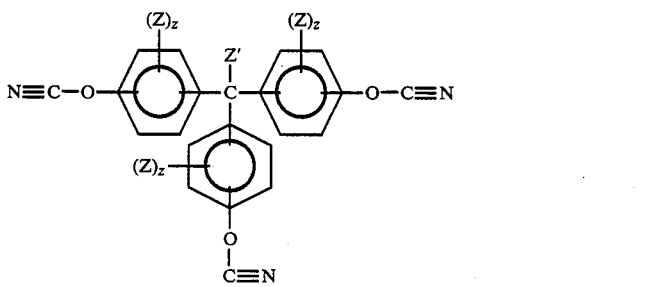

FORMULA III

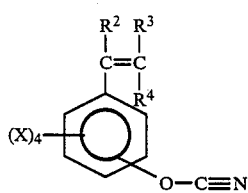

wherein each $R^2$, $R^3$ and $R^4$ independently hydrogen or a hydrocarbyl group having from 1 to about 3 carbon atoms and each X is independently hydrogen, a hydrocarbyl or hydrocarbyloxy group having from 1 to about 4 carbon atoms, chlorine or bromine or a phenyl group.

Particularly suitable alkenylphenyl cyanates include, for example, p-isopropenylphenyl cyanate, p-vinylphenyl cyanate, m-vinylphenyl cyanate, methyl-p-isopropenylphenyl cyanate, 3-chloro-4-isopropenylphenyl cyanate, o-allylphenylcyanate, p-allylphenyl cyanate mixtures thereof and the like. It is most preferred that the alkenylphenyl cyanate be substantially free of dimeric and/or oligomeric components although it is operable to use an alkenylphenylcyanate containing substantial (up to 90 percent by weight) dimeric and/or oligomeric components. Said components are formed during the cyanation reaction of an alkenylphenol containing the corresponding dimeric diphenols and/or oligomeric polyphenols. A specific preparation of p-isowherein each A is independently an alkylene group having from 1 to about 10 carbon atoms, preferably from 1 to about 4 carbon atoms, —O—,

—S—, —S—S—,

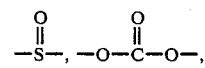

—$SO_2$—; each A' is independently and alkylene group having from 1 to about 6, preferably from 1 to about 4 carbon atoms or a

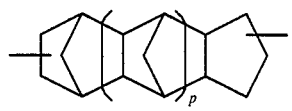

group; each Z is independently hydrogen, a hydrocarbyl or hydrocarbyloxy group having from 1 to about 10, preferably 1 to about 4 carbon atoms, a halogen, preferably chlorine or bromide, a phenyl group, or a —O—C≡N group; Z' is independently hydrogen, a hydrocarbyl or hydrocarbyloxy group having from 1 to about 10, preferably 1 group; p has a value of from zero to about 10, preferably from zero to 3; n has a value of zero or 1; m has a value from zero to about 100, preferably from zero to about 30; n" has a value of from about 0.001 to about 6, preferably from about 0.01 to about 3; z has a value of 4, and z' has a value of 3.

Particularly suitable aromatic dicyanates (polycyanates) which can be employed herein include bisphenol A dicyanate; the dicyanates of 4,4'-dihydroxydiphenyl oxide, resorcinol, 4,4'-thiodiphenol, 4,4'-sulfonydiphenol, 3,3'5,5'-tetrabromobisphenol A, 2,2'6,6'-tetrabromobisphenol A, 3-phenylbisphenol A, 4,4'-dihydroxybiphenyl, 2,2'-dihydroxybiphenyl, 2,2',4,4'-tetrahydroxydiphenyl methane, 2,2',6,6'-tetramethyl-3,3',5,5'-tetrabromobisphenol A, 3,3'-dimethoxybisphenol A;

15 the tricyanate of tris(hydroxyphenyl)methane, the polycyanate of a phenol formaldehyde condensation product (novolac), the polycyanate of a dicyclopentadiene and phenol condensation product and the like. The aromatic polycyanates may be used either alone or in any combination. A specific preparation of bisphenol A dicyanate is taught by Hefner, Jr., in U.S. Pat. No. 4,578,439 which is incorporated herein by reference.

Suitable epoxy resins include materials having an average of more than one vicinal epoxide group per molecule such as, for example, the glycidyl ethers represented by the formulas

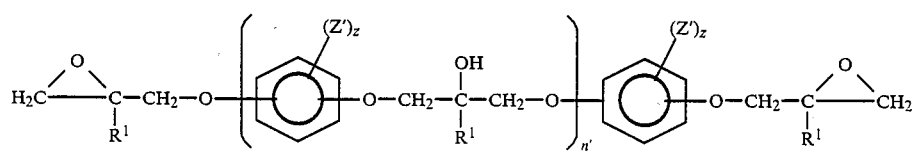
FORMULA VIII

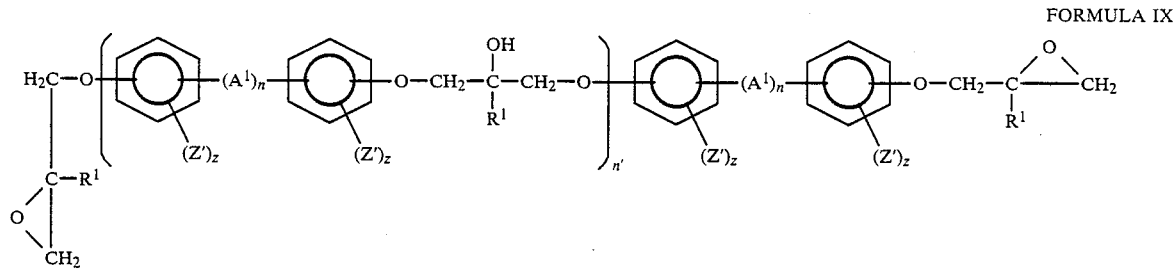
FORMULA IX

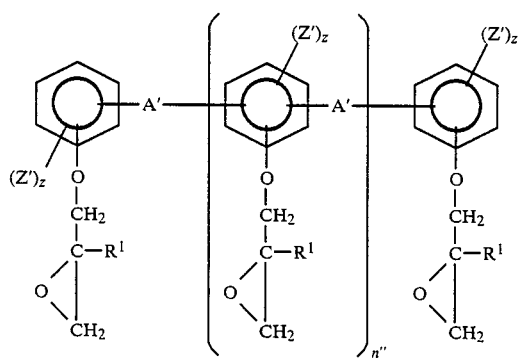
FORMULA X

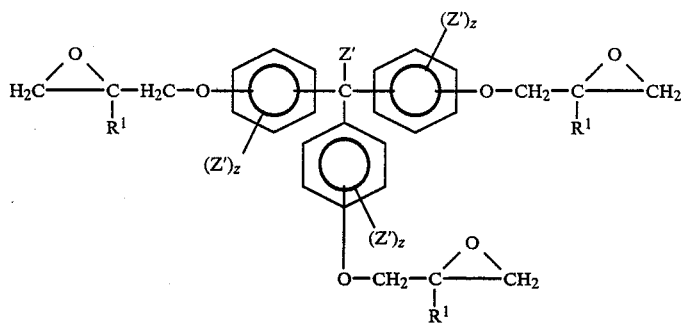

FORMULA XI wherein $A^1$ is independently an alkylene group having from 1 to about 10 carbon atoms, preferably from 1 to about 4 carbon atoms, —O—,

—S—, —S—S—,

—SO$_2$—, A', Z', $R^1$, n, n", z, z' and p are as hereinbefore defined and n' has a value of from about zero to about 30, preferably from about zero to about 5.

Particularly suitable polyepoxides which can be employed herein include, for example, the diglycidyl ethers of resorcinol, bisphenol A, 4,4'-dihydroxydiphenyl, 4,4'-dihydroxydiphenyl methane, 3,3',5,5'-tetrabromobisphenol A, the triglycidyl ether of tris(hydroxyphenyl)methane, the polyglycidyl ether of a phenol-formaldehyde condensation product (novolac), the polyglycidyl ether of dicyclopentadiene and phenol condensation product and the like. The polyepoxides can be used either alone or in combination.

The aforementioned epoxy resins can be prepared by reaction of a diphenolor polyphenol with an epihalohydrin and a basic-acting material as previously described herein.

Suitable alkenylphenol capped styryl pyridines and/or alkenylphenol capped polystyryl pyridines which can be employed herein include those prepared by reacting a di- or polymethyl pyridine compound with an aromatic di- or polyaldehyde. The resultant product is then reacted with an alkenylphenol represented by the formula III. Preparation of said alkenylphenol capped styrylpyridines is taught by LaTulip in U.S. Pat. No. 4,500,690 which is incorporated herein by reference.

Suitable bismaleimides (polymaleimides) which can be employed herein include, for example, those represented by the formulas

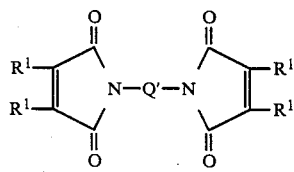

FORMULA XII

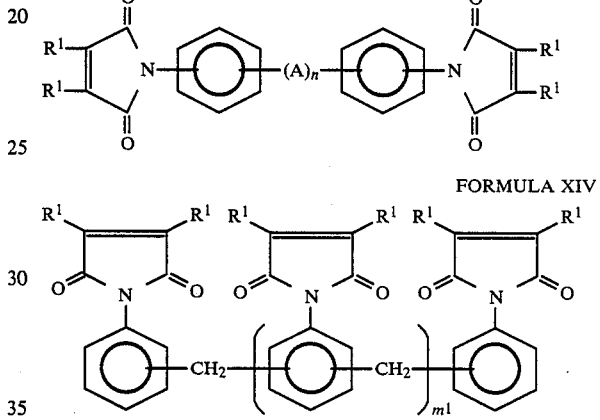

wherein $R^1$, n and A are as herein before defined; Q' is an alkylene group having from 2 to about 12 carbon atoms and $m^1$ has a value of 0.01 to about 10.

Particularly suitable bismaleimides (polymaleimides) which can be employed herein include, for example, N,N'-ethylenebismaleimide, N,N'-ethylenebis(2-methylmaleimide), N,N'-hexamethylenebismaleimide, N,N'-(oxydi-p-phenylene)bismaleimide, N,N'-(methylenedi-p-phenylene)-bismaleimide, N,N'-(thiodi-p-phenylene)bismaleimide, N,N'-(sulfonyl-di-m-phenylene)bismaleimide, N,N'-(isopropylidenedi-p-phenylene)bismaleimide, polymethylene polyphenylenepolymaleimides and the like. The bismaleimides (polymaleimides) may be used either alone or in any combination.

The bismaleimides (polymaleimides) can be prepared by reacting a stoichiometric quantity of a maleic anhydride per amine group with a diamine (polyamine) in the presence of a suitable solvent. Preparation of bismaleimides (polymaleimides) is disclosed by Arnold et al in U.S. Pat. No. 2,462,835 and by Searle in U.S. Pat. No. 2,444,536 which are incorporated herein by reference. A specific preparation of N,N'-(methylenedi-p-phenylene)bismaleimide is taught by Hefner, Jr. in U.S. Pat. No. 4,578,439 which is incorporated herein by reference.

Suitable styryl pyridine cyanates and/or polystyryl pyridine cyanates which can be employed herein include those prepared by reacting a hydroxystyryl pyridine and/or hydroxy polystyryl pyridine with a cyanogen halide in the presence of a base or basic-acting substance. Preparation of said styrylpyridine cyanates is taught by Hefner, Jr. in U.S. Pat. No. 4,578,439 which is incorporated herein by reference.

Suitable allyl styryl pyridines and/or allyl polystyryl pyridines which can be employed herein include those prepared by reacting an allylating agent such as an allyl halide or allyl methyl carbonate with a hydroxystyryl pyridine and/or a hydroxy polystyryl pyridine. Preparation of said allyl styryl pyridines is taught by Hefner, Jr. in U.S. Pat. No. 4,540,745 which is incorporated herein by reference.

Suitable alkenylphenyl glycidyl ether capped hydroxystyryl pyridines and/or alkenylphenyl glycidyl ether capped hydroxypolystyryl pyridines which can be employed herein include those prepared by reacting a alkenylphenylglycidyl ether with a hydroxystyryl pyridine and/or a hydroxypolystyryl pyridine. Preparation of said alkenylphenyl glycidyl ether capped hydroxystyrylpyridines is taught by Hefner, Jr. in U.S. Pat. No. 4,539,377 which is incorporated herein by reference.

Suitable furan capped styryl pyridines and/or furan capped polystyrylpyridines which can be employed herein are described in Ser. No. 848,100 filed April 4, 1986, which is incorporated herein by reference.

Polymerizable ethylenically unsaturated monomers which can be employed herein include the vinyl aromatic monomers such as styrene, alpha-methylstyrenes, vinyl toluenes, halogenated styrenes, t-butylstyrenes, divinylbenzenes, and the like. Other suitable monomers include the methyl, ethyl, isopropyl, octyl, etc., esters of acrylic or methacrylic acid, vinyl acetate, diallylmaleate, dimethallyl fumarate, acidic monomers such as acrylic acid, methacrylic acid, crotonic acid and amide monomers such as acrylamide, N-alkylacrylamides and the like and mixtures thereof. Allyl monomers such as dialylphthalate, triallyisocyanurate, and the like may also be used.

Curing of the polymerizable mixtures varies as a function of the amount and type of each component present to comprise said mixture. Generally, the application of heat and/or pressure optionally in the presence of one or more catalysts suitable for curing the curable functional moieties provided by the components of the mixture and defined in the incorporated cited prior art produce a cured product. As a specific example, (A) substituted epoxy resins containing styrylaza groups and one or more of (B-6) epoxy resins are cured using the previously described method for the substituted epoxy resins containing styrylaza groups.

The epoxy resins containing styrylaza groups and polymerizable mixtures thereof are useful to make laminates, castings, coatings, and the like. The laminates are made by mixing into the epoxy resin or polymerizable mixture containing the epoxy resin a known amount of one or more catalysts and/or curing agents and adding this mixture to a suitable fibrous reinforcement such as asbestos fibers, carbon fibers, fibrous glass or inorganic fibers. The epoxy resin or polymerizable mixture can be rolled, sprayed or impregnated into the fibrous reinforcement, such as fibrous glass. When fibrous glass is used, it can be in any form such as chopped strands, filaments, glass ribbons glass yarns or reinforcing mats.

The epoxy resin or polymerizable mixture may be compounded with solvents, pigments, low profile additives, fillers, flow modifiers or other resinous products and cured to form useful coatings in a manner well known in the art. The following examples are illustrative of the invention, but are not to be construed as to limiting the scope thereof in any manner.

EXAMPLE 1

A. Synthesis of 2,6-(3,5-dimethyl-4-hydroxystyryl)pyridine 107 g of 2,6-lutidine (1 mole), 375 g of 3,5-dimethyl-4-hydroxybenzaldehyde (2.5 moles), 510 g of acetic anhydride (5 moles) and 300.2 g of acetic acid (5 moles) were placed in a 2-liter round bottom flask equipped with a magnetic stirrer, nitrogen pad, thermometer and reflux condenser. The flask was heated to 140° C. for five days. The flask was then cooled to room temperature and equipped with a simple distillation head. The solution was distilled to remove the acetic acid and acetic anhydride. The remaining material after cooling to room temperature was a light brown solid. The solid was then washed with 1000 ml of methanol and filtered resulting in a white solid that was analyzed by nuclear magnetic resonance spectroscopy (NMR) and demonstrated to be 2,6-di(3,5-dimethyl-4-acetoxystyryl)pyridine. The white solid, 200 ml of methanol, 1000 ml of water and 88.0 g of NaOH (2.2 moles) were placed in a 2-liter round bottom flask equipped the same as above and heated to 70° C. with stirring for 24 hours. The flask was then cooled to room temperature and equipped with a distillation head. The flask was heated to distill off the methanol and leave the water soluble sodium salt. The aqueous solution was then acidified with HCl causing a pale yellow solid to drop out. The solid was filtered and dried under vacuum at 110° C. for 2 hours. The material was analyzed by nuclear magnetic resonance spectroscopy (NMR) and differential scanning calorimetry (DSC). The NMR analysis confirmed the product structure. The DSC showed a distinct melting point at 207° C. (endotherm) with no exotherms noted.

B. Synthesis of Epoxy Resin of 2,6-(3,5-dimethyl-4-hydroxystyryl)pyridine

A portion (185.73 grams, 1.0 hydroxyl equivalent) of the substituted hydroxystyrylpyridine from A above, epichlorohydrin (5.0 moles, 462.65 grams), isopropanol (35% by weight of epichlorohydrin used, 249.12 grams) and water (8% by weight of epichlorohydrin used, 40.23 grams) were added to a reactor and stirred under a nitrogen atmosphere at 50° C. until a fine suspension was formed. At this time, dropwise addition of sodium hydroxide (1.8 moles, 72.0 grams) solution in water (288.0 grams) commenced and was completed over the next 45 minutes and at a rate so as to maintain the reaction temperature between 50° and 52° C. Fifteen minutes after the addition of sodium hydroxide solution, a second solution of sodium hydroxide (0.8 mole, 32.0 grams) in water (128.0 grams) was added dropwise to the reactor over the next 20 minutes so as to maintain the reaction temperature at 50° C. After fifteen minutes of post reaction between 50° and 53° C., the reactor was cooled over a 14 minute period to 40° C. then an initial water wash (750 grams) was added to the reactor and the contents were transferred to a separatory funnel. The water wash layer was separated and discarded while the organic layer was added back into the separatory funnel with a second water wash (750 grams) and epichlorohydrin (250/grams). The water wash layer was separated and discarded while the organic layer was added back into the separatory funnel with a final water wash (500/grams). The recovered organic layer was stripped of solvents by rotary evaporation at 80° C. for 120 minutes under vacuum. The epoxy resin was recovered (234.9 grams) as a light gray colored solid. Epoxide titration (with correction for response provided by the substituted hydroxystyrylpyridine starting reactant) revealed the presence of 16.99% epoxide. Nuclear magnetic resonance spectroscopic analysis of a portion of the epoxy resin demonstrated complete conversion of the phenolic hydroxyl groups to glycidyl ether groups. Differential scanning calorimetry revealed a distinct melting point endotherm at 158° C. followed by an exotherm at 315° C.

EXAMPLE 2

Advancement Reaction of Epoxy Resin of 2,6-(3,5-dimethyl-4-hydroxystyryl)pyridine with 2,6-(3,5-dimethyl-4-hydroxystyryl)pyridine A portion (25.0 grams, 0.0988 epoxide equivalent) of the styryl pyridine epoxy resin from Example 1-B, 2,6-(3,5-dimethyl-4-hydroxystyryl)pyridine from Example 1-A (11.58 grams, 0.0624 hydroxyl equivalent) and methylamyl ketone solvent (100 grams) were added to a reactor and maintained under a nitrogen atmosphere with stirring. Heating commenced and once a reaction temperature of 90° C. was achieved, ethyltriphenylphosphonium acetate.acetic acid complex (0.04 gram, 0.1 percent by weight of reactants used) (70% by weight in methanol) was added to the reactor. Heating again commenced until a reaction temperature of 150° C. was achieved. After one hour of reaction at 150° C., the advanced epoxy resin was recovered as a dark amber solution. Removal of the methylamyl ketone solvent by rotary evaporation under vacuum yielded a brown colored solid. Epoxide titration (with correction for response provided by the substituted hydroxystyrylpyridine starting reactant) revealed the presence of 7.38% epoxide.

Repeating the advancement reaction using 50.0 grams (0.1976 epoxide equivalent of the epoxy resin of 2,6-di(3,5-dimethyl-4-hydroxystyryl)pyridine and 27.52 grams (0.1482 hydroxyl equivalent) of 2,6-di(3,5-dimethyl-4-hydroxystyryl)pyridine provided an advanced epoxy resin containing 4.02% epoxide (corrected).

EXAMPLE 3

Curing of Epoxy Resin of 2,6-(3,5-dimethyl-4-hydroxystyryl)pyridine with Dicyandiamide A portion (0.5062 gram, 0.002 epoxide equivalent) of the epoxy resin of 2,6-(3,5-dimethyl-4-hydroxystyryl)pyridine from Example 1-B and dicyandiamide (0.0420 gram, 0.002 equivalent) were mixed to form a homogeneous powder. A portion (10.3 milligram) of the powder was analyzed by differential scanning calorimetry (DSC) at a 10° C. rate of temperature increase from 30° to 250° C. in a stream of nitrogen flowing at 35 cubic centimeters per minute. The results are reported in Table I.

TABLE I

| | |
|---|---|
| Temperature of Melt Endotherm | 156° C. |
| Temperature of Maximum Exotherm | 192° C. |
| Heat of Reaction | 3586 mJ |
| Specific Heat of Reaction | 335 J/g |
| Reaction Order | 2.20 (0.06)[a] |

TABLE I-continued

| | |
|---|---|
| Activation Energy | 410 kJ/mol (11.8)[1] |

[a]95% Confidence Limits

EXAMPLE 4

Thermogravimetric Analysis of Epoxy Resin of 2,6-di(3,5-dimethyl-4-hydroxy-styryl)pyridine Cured with Dicyandiamide A portion (0.40 gram) of the homogeneous blend of the epoxy resin of 2,6-di(3,5-dimethyl-4-hydroxystyryl)pyridine and dicyandiamide from Example 3 was cured for two hours at 200° C. to provide a transparent, amber colored, rigid solid. A portion (29.52 milligrams) of the cured epoxy resin was analyzed by thermogravimetric analysis (TGA) at a 10° C. per minute rate of temperature increase from 50° to 950° C. in a stream of nitrogen flowing at 25 cubic centimeters per minute. The results are reported in Table II.

TABLE II

| Temperature (°C.) | Weight (percent of original) |
|---|---|
| 200 | 100 |
| 300 | 99.5 |
| 350 | 97.5 |
| 400 | 67.5 |
| 450 | 45 |
| 500 | 37.5 |
| 750 | 31 |
| 900 | 29 |

EXAMPLE 5

Copolymerization of Epoxy Resin of 2,6-di(3,5-dimethyl-4-hydroxystyryl)pyridine and Dicyanate of 2,6-di(3,5-dimethyl-4-hydroxystyryl)pyridine A portion (40.0 grams, 0.1581 epoxide equivalent) of the epoxy resin of 2,6-di(3,5-dimethyl-4-hydroxystyryl)pyridine from Example 1-B and the dicyanate of 2,6-di(3,5-dimethyl-4-hydroxystyryl)pyridine (34.9 grams, 0.1656 cyanate equivalent) were mixed thoroughly then B-staged by heating to 150° C. for 60 minutes. After cooling, the solid product was ground to a fine powder. Twenty two grams of the powder was loaded into a 4 inch by 4 inch by ⅛ inch stainless steel mold then compression molded (100 psi) for three hours at 177° C. then for two hours at 200° C. Thermal mechanical analysis (TMA) (expansion mode) of a portion of the copolymer was completed using a rate of heat increase of 10° C. per minute from 50° C. to 400° C. A midpoint glass transition temperature (Tg) of 268° C. was observed. Thermogravimetric analysis was completed using the method of Example 4. A five percent weight loss was observed at 386° C. with 38.8 weight percent of the original material remaining at 900° C.

EXAMPLE 6

Mechanical Property Testing of Clear, Unfilled Casting of Methylenedianiline Cured Epoxy Resin of 2,6-di(3,5-dimethyl-4-hydroxystyryl)pyridine A portion (200 grams, 0.705 epoxide equivalent) of an epoxy resin of 2,6-di-(3,5-dimethyl-4-hydroxystyryl)pyridine synthesized using the method of Example, 1-B was combined with methylenedianiline (34.88 grams, 0.705 amine hydrogen equivalent) which had been preheated to 100° C. This solution was used to prepare a clear, unfilled ⅛ inch casting for tensile and flexural strength, tensile and flexural modulus, percent elongation and fracture energy (G1c) determinations. The casting was cured for 60 minutes at 100° C. followed by post curing for 15 minutes at 150° C. then 120 minutes at 180° C. Mechanical properties of tensile and flexural test pieces were determined using an Instron machine with standard test methods (ASTM D-638 and D-790). Fracture energy was measured using one inch square test pieces which were drilled to place two 0.203 inch holes on the same edge spaced 0.458 inch apart from the centers and 0.271 inch from each respective upper outer edge and positioned 0.200 inch into the sample. A dovetail notch was cut centered in the 0.458 inch space between the centers of the pair of holes. Using a sharp razor blade and a malet, a precrack was made into the dovetail notch. Only samples having precrack lengths of 0.09375 to 0.3125 inch with angles of less than 30° and sharp, smooth fronts were retained for testing. The drilled holes were used to mount each sample for testing in the tensile mode on an Instron machine at a crosshead speed of 0.02 inch per minute. The evaluation of fracture energy is an adaptation of ASTM E-399 used for testing of metals. Thermal mechanical analysis was completed using the method of Example 5. The results are reported in Table III.

COMPARATIVE EXPERIMENT A

Mechanical Property Testing of Clear, Unfilled Casting of Methylenedianiline Cured Diglycidyl Ether of Bisphenol A A portion (200 grams, 1.111 epoxide equivalents) of a diglycidyl ether of bisphenol A was combined with methylenedianiline (55.0 grams, 1.111 amine hydrogen equivalents) which had been preheated to 100° C. This solution was used to prepare a clear, unfilled ⅛ inch casting which was cured, postcured and tested for mechanical properties using the method of Example 6. The results are reported in Table III.

TABLE III

|  | Example 6 | Comparative Experiment A |
|---|---|---|
| Tensile Strength (psi) | 11,270 | 10,300 |
| Tensile Modulus (psi) | 318,000 | 340,000 |
| Elongation (%) | 6.9 | 3.6 |
| Flexural Strength (psi) | 12,330[1] | 18,300 |
| Flexural Modulus (psi) | 205,000[1] | 390,000 |
| Fracture Energy (kJ/M) | 0.22 | 0.18 |
| Glass Transition Temperature (°C.) | 202 | 164 |

[1]All samples tested to a yield without breaking. All samples of the Comparative Experiment tested to a break.

EXAMPLE 7

Thermogravimetric Analysis of Methylenedianiline Cured Epoxy Resin of 2,6-di(3,5-dimethyl-4-hydroxystyryl)pyridine Thermogravimetric analysis of a portion of the clear, unfilled casting of Example 6 was completed using the method of Example 4 to a ceiling temperature of 800° C. Thermogravimetric analysis of a second portion of the clear, unfilled casting of Example 6 was completed using the method of Example 4 to a ceiling temperature of 800° C. and with a change from nitrogen to an air atmosphere. The results are reported in Table IV.

COMPARATIVE EXPERIMENT B

Thermogravimetric Analysis of Methylenedianiline Cured Diglycidyl Ether of Bisphenol A Thermogravimetric analysis of portions of the clear, unfilled casting of Comparative Experiment A were completed using the method of Example A. The results are reported in Table IV.

TABLE IV

|  | Example 7 | Comparative Experiment B |
|---|---|---|
| Five Percent Weight Loss Temperature (°C.) | 371 | 372 |
| Weight Percent of Original Material Remaining at 800° C. | 33.5 | 16.5 |

COMPARATIVE EXPERIMENT C

Synthesis and Attempted Epoxidation of Unsubstituted Hydroxy Functional Styryl Pyridine of 2,4,6-Trimethylpyridine and 4-Hydroxybenzaldehyde In a 500 milliliter glass resin kettle equipped with a stirrer, thermometer, nitrogen purge and a reflux condenser, there was introduced 378.9 grams (3.11 moles) of 4-hydroxybenzaldehyde and 187.9 grams (1.55 moles) of 2,4,6-trimethylpyridine. The reaction mixture was heated until homogeneity resulted, then 6.32 milliliters (2.0% weight of total reactants) of concentrated sulfuric acid was added. The mixture was reacted for four hours over a temperature range of 165° C. to 195° C. The resulting product was a viscous, maroon colored liquid. When allowed to cool to room temperature (25° C.), a hard, brittle solid formed. The product possessed a melting point range from 115° C. to 130° C. which was taken as evidence of an oligomeric mixture. Elemental analysis revealed the presence of the following weight percent values: Carbon=75.9%, Nitrogen=4.0%, Hydrogen=5.6%. Infrared spectrophotometric analysis revealed a total lack of aldehyde carbonyl absorbance (1670 cm$^{-1}$), thus demonstrating that complete reaction of the 4-hydroxybenzaldehyde had occurred. Expected trans unsaturation absorbance was observed (970 cm$^{-1}$) as well as aromatic carbon-oxygen absorbance (1250 cm$^{-1}$) due to the phenolic substituents. Phenolic hydroxyl group absorbance (3300 cm$^{-1}$) was also observed.

An attempt to epoxidize this unsubstituted hydroxystyryl pyridine was made using the method of Example 1-B and resulted in gelation followed by exothermic decomposition to a black char. This decomposition occurred during the stripping off of solvent and residual epichlorohydrin from the recovered final epoxidation product organic layer by rotary evaporation at 80° C. under vacuum.

EXAMPLE 8

A. Synthesis of 2,5-(3,5-dimethyl-4-hydroxystyryl)pyrazine 86.51 grams of 2,5-dimethylpyrazine (0.80 mole), 240.27 grams of 3,5-dimethyl-4-hydroxybenzaldehyde (1.60 moles) and 4.24 grams of concentrated sulfuric acid (0.043 mole) were placed in a one liter round bottom flask equipped with a magnetic stirrer, nitrogen pad, thermometer and a molecular sieve filled Dean Stark trap/reflux condenser assembly. The flask was heated with stirring to 140° C. and maintained therein for five days. During the course of the reaction, 2,5-dimethylpyrazine that had distilled over into the Dean Stark trap was drained off with fresh 2,5-dimethylpyrazine added back to the reactor (21.9 grams total added during the second, third and fourth days of reaction). The product was recovered at room temperature (24° C.) as a dark brown tar and added to a 700 milliliter volume of acetone. The acetone mixture was agitated for 12 hours followed by filtration to provide an orange powder product in the filter. The powder was washed with two 100 milliliter portions of warm (50° C.) water, then dried under vacuum to a constant weight of 51.2 grams. Analysis of a portion of the product by nuclear magnetic resonance spectroscopy in hexadeuterodimethylsulfoxide at 50° C. confirmed the product structure. Differential scanning calorimetry of a portion of the product showed a distinct melting point at 291° C. (endotherm) with a broad exotherm occurring immediately after melting with a maximum at 331° C.

B. Synthesis of Epoxy Resin of 2,5-(3,5-dimethyl-4-hydroxstyryl)pyrazine.

A portion (8.80 grams, 0.0473 hydroxyl equivalent) of the substituted hydroxystyrylpyrazine from A above, epichlorohydrin (43.73 grams, 0.473 mole), isopropanol (11.77 grams), water (1.90 grams) and dimethylsulfoxide (40.0 grams) were added to a reactor and stirred under a nitrogen atmosphere at 50° C. to provide a solution. Dropwise addition of sodium hydroxide (1.70 grams) solution in water (6.81 grams) commenced and was completed over the next 25 minutes and at a rate so as to maintain the 50° C. reaction temperature. Twenty minutes after the addition of sodium hydroxide solution, a second solution of sodium hydroxide (0.76 gram) in water (3.03 grams) was added dropwise to the reactor over the next ten minutes and so as to maintain the 50° C. reaction temperature. After ten minutes of post reaction at 50° C., the reactor was cooled to 30° C. and the contents filtered. The filtered solid epoxy resin was washed with two 50 milliliter portions of 50° C. deionized water then dried under vacuum to a constant weight of 5.19 grams. The filtrate was diluted with 100 milliliters of epichlorohydrin then washed with two 50 milliliter portions of 50° C. deionized water. The recovered organic layer was stripped of solvents by rotary evaporation at 100° C. for 60 minutes under vacuum to provide 5.14 grams of solid epoxy resin. Analysis of both portions of the epoxy resin product by nuclear magnetic resonance spectroscopy in hexadeuterodimethylsulfoxide at 50° C. confirmed the product structure, demonstrating complete conversion of the phenolic hydroxyl groups to glycidyl ether groups. Differential scanning calorimetry of a portion of the product showed a distinct melting point at 190° C. (endotherm) with an exotherm occurring immediately after melting with a maximum at 236° C.

EXAMPLE 9

Advancement Reaction of Epoxy Resin of 2,5-(3,5-dimethyl-4-hydroxystyryl)pyrazine with 2,5-(3,5-dimethyl-4-hydroxystyryl)pyrazine A portion (0.969/gram, 0.002 mole) of the styryl pyrazine epoxy resin from Example 8-B, 2,5-(3,5-dimethyl-4-hydroxystyryl)pyrazine from Example 8-A (0.559 gram, 0.0015 mole) and dimethylsulfoxide solvent (100 grams) were added to a reactor and maintained under a nitrogen atmosphere with stirring. Heating commenced and once a reaction temperature of 90° C. was achieved, ethyltriphenylphosphonium acetate.acetic acid complex (0.0015 gram, 0.1 percent by weight of reactants used) (70% by weight in methanol) was added to the reactor. Heating again commenced until a reaction temperature of 150° C. was achieved. After fourteen hours of reaction at 150° C., the advanced epoxy resin was recovered as a dark amber solution. Addition of the solution to 500 milliliters of deionized water precipitated the bright yellow product which was recovered by filtration then dried under vacuum to a constant weight.

EXAMPLE 10

Characterization of the Advancement Reaction Product of Epoxy Resin of 2,5-(3,5-dimethyl-4-hydroxystryl)pyrazine with 2,5-(3,5-dimethyl-4-hydroxystyryl)pyrazine for Liquid Crystallinity A portion (11.67 milligrams) of the advancement reaction product from Example 9 above was analyzed by differential scanning calorimetry using a heating rate of 10° C. per minute and a temperature range of 30° to 250° C. The following results were obtained for the first cycle of heating of the sample from 30° to 250° C.:

| Observed Transition Temperatures (°C.) midpoint/range | Enthalpy (J/G) |
|---|---|
| 83/45–123 (endotherm) | 22.6 |
| 137/125–197 (endotherm) | 23.9 |
| 211/202–238 (endotherm) | 2.3 |
| above 238 exotherms | |

A first cycle of cooling from 25° to 30° C. produced no observable transitions. A second cycle of heating likewise produced no observable transitions. Removal of the sample after analysis revealed that it had become very hard and brittle and was insoluble in boiling acetone. Conversely, the advanced epoxy resin from Example 9 was soluble in boiling acetone.

Analysis of a portion of the advancement reaction product via polarized light microscopy was completed using a microscope equipped with a programmable hot stage using a heating rate of 20° C. per minute. The following results were obtained:

| Observed Transition Temperatures (°C.) | Comments |
|---|---|
| 25 | Sample is solid, no flow, edges are birefringent where sample is thin enough to pass light. |
| 52 | Shearing by pressing of the sample between the coverslip and slide produces first birefringent fluid. Birefringence ceases as shearing stops. |
| 75 | Fluid is very thin and |

-continued

| Observed Transition Temperatures (°C.) | Comments |
|---|---|
| 200 | shear birefringent. Birefringent fluid as sheared but viscosity has increased, birefringence still ceases as shearing stops but is retained longer. |
| 217 | Highly viscous fluid, birefringence is retained as sheared resin solidifies. |

We claim:
1. A substituted epoxy resin composition containing styrylaza groups prepared by reacting
   (A) a substituted hydroxystyrylaza compound prepared by reacting
      (1) one or more monohydroxy aromatic aldehydes wherein the ortho and para positions from the hydroxy group having no aldehyde groups are substituted by groups inert to condensation with alkyl azines, and
      (2) one or more methylated azine compounds having the formula

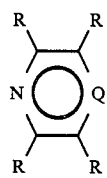

wherein Q is N or C—R, and each R is independently hydrogen, a halogen, a hydrocarbyl or hydrocarbyloxy group having from 1 to about 20 carbon atoms, nitro, nitroso, nitrile,

allyl or a methallyl group; E is a hydrocarbyl group having from 1 to about 20 carbon atoms; with the proviso that the total number of methyl groups (R=—CH₃) substituted on the ring is in the range from 2 to 4, and, optionally,
   (3) one or more aromatic dialdehydes having the formula

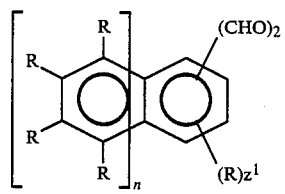

wherein each R is independently hydrogen, a halogen, a hydrocarbyl or hydrocarbyloxy group having from 1 to about 20 carbon atoms, nitro, nitroso, nitrile,

allyl or a methallyl group; E is a hydrocarbyl group having from 1 to about 20 carbon atoms; n has a value of zero or 1 and when n is zero, z¹ is four, when n is 1, z¹ is two, and,
   (B) one or more epihalohydrins, in the presence or one or more basic-acting substances.
2. The substituted epoxy resin containing styrylaza groups of claim 1 wherein the precursor substituted hydroxystyrylaza compound has one of the formulas

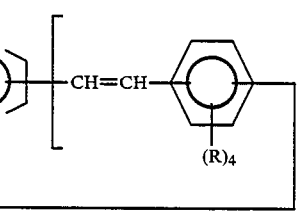
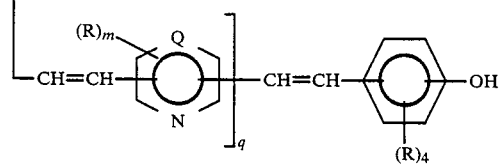

FORMUAL I

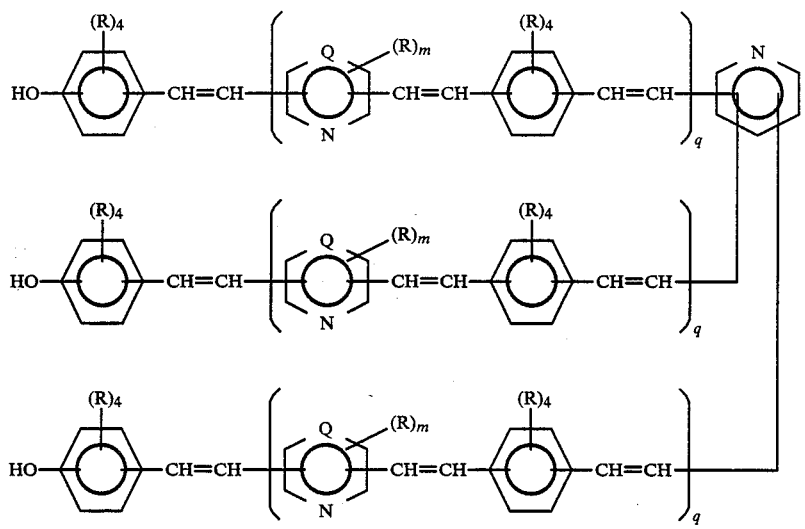

FORMULA II

3. A polymerizable mixture comprising the substituted epoxy resin containing styrylaza groups of claims 1 or 2 and one or more of the group consisting of
   (1) styryl pyridines and/or prepolymers or polymers thereof;
   (2) vinyl styryl pyridines and/or prepolymers or polymers thereof;
   (3) alkenylphenyl cyanates;
   (4) dicyanates and/or polycyanates;
   (5) bismaleimides and/or polymaleimides;
   (6) epoxy resins;
   (7) alkenylphenol capped styryl pyridines and/or prepolymers or polymers thereof;
   (8) allyl styryl pyridines and/or prepolymers or polymers thereof;
   (9) styryl pyridine cyanates and/or prepolymers or polymers thereof;
   (10) furan capped styryl pyridines and/or prepolymers or polymers thereof;
   (11) alkenylphenyl glycidyl ether capped hydroxystyryl pyridines and/or prepolymers or polymers thereof;
   (12) polymerizable ethylenically unsaturated monomers.

4. The cured composition of claims 1, 2 or 3.

* * * * *